US008245095B2

(12) United States Patent
Ou et al.

(10) Patent No.: US 8,245,095 B2
(45) Date of Patent: Aug. 14, 2012

(54) UPGRADED CODEWORD LOCK STATE MACHINE

(75) Inventors: Peng Ou, Shenzhen (CN); Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 839 days.

(21) Appl. No.: 12/370,018

(22) Filed: Feb. 12, 2009

(65) Prior Publication Data

US 2009/0276681 A1 Nov. 5, 2009

Related U.S. Application Data

(60) Provisional application No. 61/049,177, filed on Apr. 30, 2008.

(51) Int. Cl.
*H03M 13/00* (2006.01)

(52) U.S. Cl. ........................................................ 714/752

(58) Field of Classification Search .......... 714/751–752, 714/755, 786

See application file for complete search history.

(56) References Cited

U.S. PATENT DOCUMENTS

| | | | | |
|---|---|---|---|---|
| 5,710,783 | A | * | 1/1998 | Luthi et al. ..................... 714/755 |
| 2003/0106014 | A1 | | 6/2003 | Dohmen et al. |
| 2007/0206709 | A1 | | 9/2007 | Khermosh et al. |
| 2008/0040643 | A1 | | 2/2008 | Effenberger |
| 2008/0115037 | A1 | | 5/2008 | Effenberger |
| 2008/0317022 | A1 | | 12/2008 | Ahmed et al. |

FOREIGN PATENT DOCUMENTS

| | | |
|---|---|---|
| JP | 2004221780 A | 8/2004 |
| WO | 2006038055 A1 | 4/2006 |
| WO | 2007021157 A1 | 2/2007 |
| WO | 2008038067 A1 | 4/2008 |

OTHER PUBLICATIONS

IEEE P802.3av™D2.2, "Draft Standard for Information Technology—Telecommunications and Information Exchange Between Systems—Local and Metropolitan Area Networks—Specific Requirements Part 3: Carrier Sense Multiple Access with Collision Detection (CSMA/CD) Access Method and Physical Layer Specifications," IEEE Computer Society, Dec. 3, 2008, 267 pages.

IEEE 802.3ah/2005, "Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications," IEEE Computer Society, 417 pages.

Foreign Communication From a Related Counterpart Application—International Search Report and Written Opinion, PCT/CN2009/071588, Jul. 2, 2009, 14 pages.

* cited by examiner

*Primary Examiner* — Shelly A Chase
(74) *Attorney, Agent, or Firm* — Conley Rose, P.C.; Grant Rodolph; Stephen R. Loe

(57) ABSTRACT

An apparatus comprising a Forward Error Correction (FEC) processor coupled to an optical receiver, wherein the FEC processor is configured to compare a plurality of received blocks to a plurality of FEC codeword blocks comprising a plurality of parity blocks, and upon detecting a misaligned block in the received blocks, compare at least some of the remaining received blocks to the parity blocks. Also included is an apparatus comprising at least one component configured to implement a method comprising receiving a plurality of blocks, wherein the quantity of received blocks is equal to a quantity of blocks in a FEC codeword, selecting one of the received blocks, determining whether the selected block is aligned with the FEC codeword, and determining whether the remaining blocks correspond to the FEC codeword when the selected block is not aligned with the FEC codeword.

21 Claims, 6 Drawing Sheets

UPGRADED CODEWORD LOCK STATE MACHINE

CROSS-REFERENCE TO RELATED APPLICATIONS

The present application claims priority to U.S. Provisional Patent Application 61/049,177, filed Apr. 30, 2008 by Peng Ou, et al., and entitled "Upgraded Codeword Lock State Machine," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 Gigabits per second (Gbps) while upstream data is transmitted at about 1.25 Gbps. However, the bandwidth capability of the PON systems is expected to increase as the demands for services increase. To meet the increased demand in services, some emerging PON systems, such as Next Generation Access (NGA) systems, are being reconfigured to transport the data frames with improved reliability and efficiency at higher bandwidths, for example at about ten Gbps.

Improving the systems' error detection and correction schemes in Emerging PON systems is one part that impacts reliability and efficiency, which may become more critical for systems with higher bandwidths. Such schemes may comprise a Forward Error Correction (FEC) scheme, which may enable higher transmission rates, longer distances between the OLT and the ONUS, and higher split ratios in branching PON architectures, such as PON trees.

SUMMARY

In one embodiment, the disclosure includes an apparatus comprising a Forward Error Correction (FEC) processor coupled to an optical receiver, wherein the FEC processor is configured to compare a plurality of received blocks to a plurality of FEC codeword blocks comprising a plurality of parity blocks, and upon detecting a misaligned block in the received blocks, compare at least some of the remaining received blocks to the parity blocks.

In another embodiment, the disclosure includes an apparatus comprising at least one component configured to implement a method comprising receiving a plurality of blocks, wherein the quantity of received blocks is equal to a quantity of blocks in a FEC codeword, selecting one of the received blocks, determining whether the selected block is aligned with the FEC codeword, and determining whether the remaining blocks correspond to the FEC codeword when the selected block is not aligned with the FEC codeword.

In yet another embodiment, the disclosure includes a method comprising obtaining a codeword lock in a FEC codeword lock state machine using a state that verifies whether a plurality of blocks represents the end of a FEC codeword.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to the FEC scheme, data may be transported using FEC frames or codewords, which may comprise a plurality of data blocks and parity blocks. The data blocks and parity blocks may comprise a plurality of synchronization (sync) header bits, which may be used to distinguish between the data blocks and the parity blocks. Using a "state machine" model, each received quantity of blocks, which may correspond to an FEC codeword, may be aligned or "locked", for instance in a buffer, framer, or memory location. The FEC codeword may be locked after detecting one by one its data blocks and parity blocks and verifying that the blocks' sequence matches the expected block sequence of an FEC codeword. Otherwise, when a block is detected as out of sequence, the process may be restarted at the second block in the block's sequence to detect and lock the correct block sequence. As the bit error rate (BER) of the received FEC codewords increases, achieving locking using the state machine model may become more time consuming, which may reduce communications efficiency at higher transmission rates.

Disclosed herein, is a system and method for an improved codeword lock state machine that achieves codeword lock in less time than prior systems. The method may begin by detecting the received blocks one by one and verifying the sequence of the blocks. When a block is detected as out of sequence, the codeword lock state machine may verify if the remaining blocks represent the parity blocks of the FEC codeword. If the remaining blocks are verified as the parity blocks, the method may be restarted at the start of the next FEC codeword, which may then be locked with higher certainty. Otherwise, if the remaining blocks do not represent the parity blocks, the process may be restarted shifting the sequence by one block. By verifying whether the remaining blocks are the parity blocks before restarting the process at the shifted blocks, the expected processing time of the codeword lock state machine may be reduced.

Figure 1:
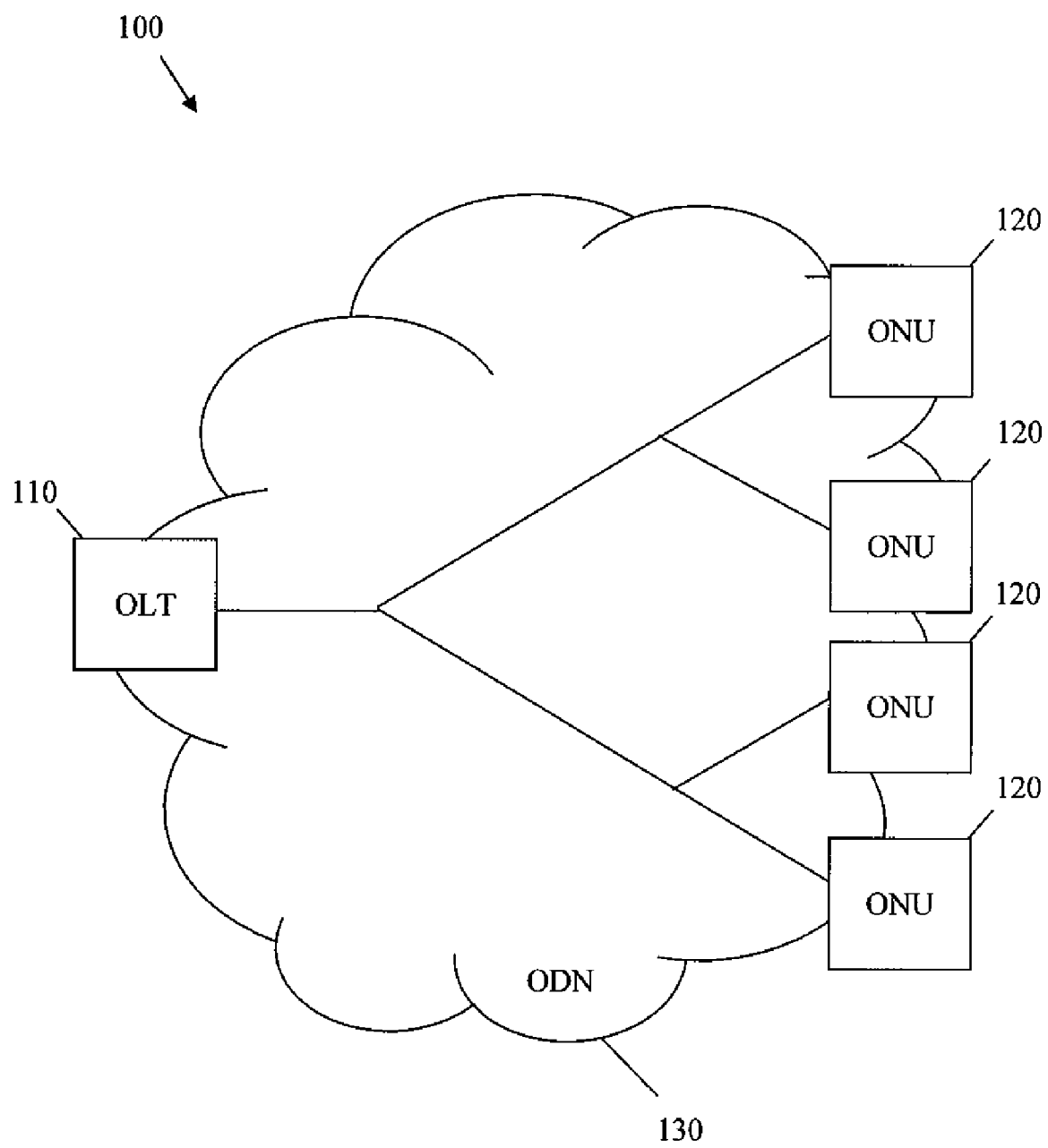
FIG. 1 is a schematic diagram of an embodiment of a PON.

FIG. 1 illustrates one embodiment of a PON 100. The PON 100 comprises an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. The PON 100 may be NGA systems, such as ten Gbps GPONs (or XGPONs), which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by the ITU-T G.983 standard, the GPON defined by the ITU-T G.984 standard, the Ethernet PON (EPON) defined by the IEEE 802.3ah standard, and the Wavelength Division Multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of processing equipment, such as optical amplifiers. The ODN 130 may typically extend from the OLT 110 to the ONUs 120 in a branching configuration as shown in FIG. 1, but may be alternatively configured in any other point-to-multi-point configuration.

In an embodiment, the OLT 110, the ONUs 120, or both may be configured to implement an FEC scheme to control or reduce transmission errors. As part of the FEC scheme, the data may be combined with an error correction code, which may comprise redundant data, before being transmitted. For instance, the data and the error correction code may be encapsulated or framed into an FEC codeword, which may be received and decoded by another PON component. In some embodiments, the FEC codeword may comprise the error correction code and may be transmitted with the data without modifying the data bits. When the error correction code is received, at least some of the errors in the transmitted data, such as bit errors, may be detected and corrected without the need to transmit additional data. Transmitting the error correction code in addition to the data may consume at least some of the channel bandwidth, and hence may reduce the bandwidth available for data. However, the FEC scheme may be used for error detection instead of a dedicated back-channel to reduce the error detection scheme complexity, cost, or both.

The FEC scheme may comprise a state machine model, which may be used to lock an FEC codeword, e.g., determine if a plurality of received blocks that represent the FEC codeword are aligned appropriately or in a correct sequence. Locking the FEC codeword or verifying its blocks' alignment may be necessary to obtain the data and the error correction code correctly. For instance, the OLT 110, the ONUs 120, or both may comprise an FEC processor, which may be hardware, such as a circuit, or software that implements the state machine model. The FEC processor may be coupled to the corresponding receivers and/or deframers at the OLT 110 or the ONUs 120, and may use analog-to-digital conversion, modulation and demodulation, line coding and decoding, or combinations thereof. The FEC codeword comprising the received blocks may also be locked at a memory location or buffer coupled to the FEC processor and the receiver.

Figure 2:
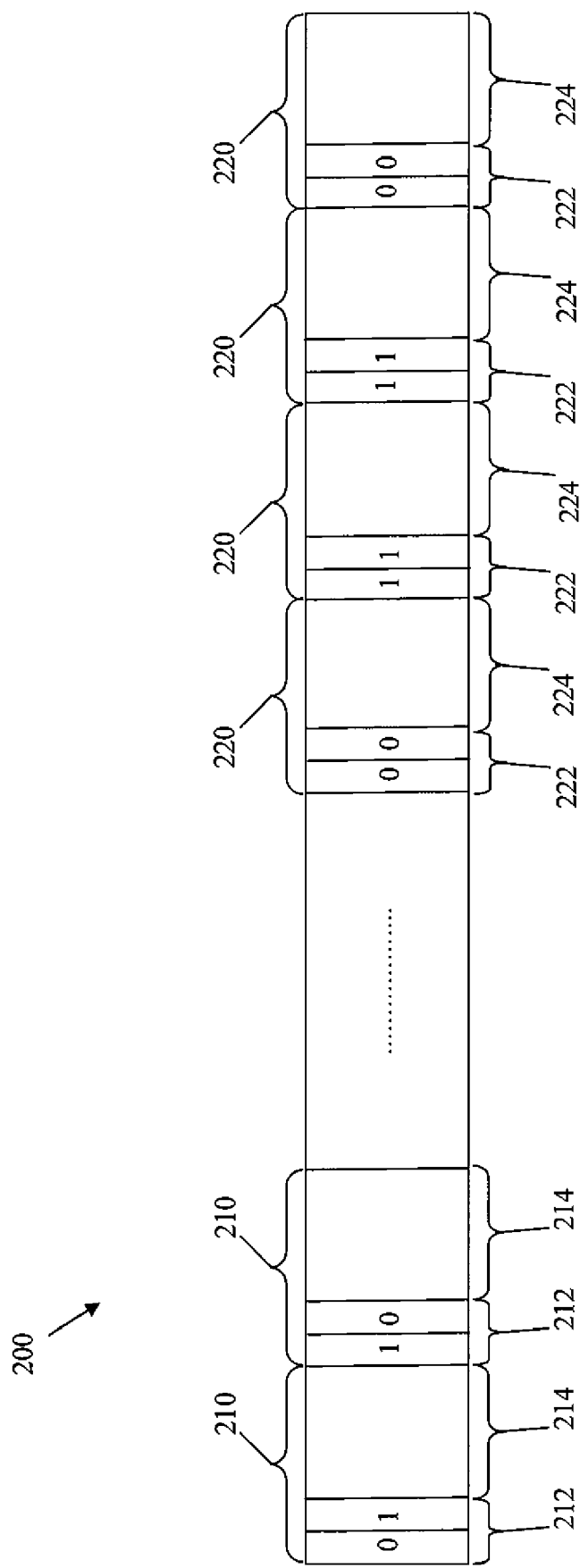
FIG. 2 is an illustration of an embodiment of an FEC codeword.

FIG. 2 illustrates an embodiment of an FEC codeword 200, which may be locked using the FEC processor of the OLT 110 or the ONUs 120. The FEC codeword 200 may comprise a fixed number of packets or blocks, such as about 31 blocks, which may comprise a plurality of data blocks 210 and a plurality of parity blocks 220. For instance, the FEC codeword may comprise a predetermined quantity of data blocks 210, which may be equal to about 27, and a remaining quantity of parity blocks 220, which may be equal to about four. Each data block 210 and parity block 220 may comprise a plurality of bits, which may be equal to about 66 bits. For instance, each data block 210 may comprise a fixed number of sync header bits 212, which may be equal to about two, and a remaining number of payload bits 214, which may be equal to about 64. Similarly, each parity block 220 may comprise about two sync header bits and about 64 payload bits 224. The sync header bits 212 of the data blocks 210 may be different than the sync header bits 222 of the parity blocks 220, and hence the sync header bits may be used to distinguish between the two different types of blocks.

In an embodiment of the FEC codeword 200, the sync header bits 212 of the data blocks 210 may be set to (1,0) or (0,1). Hence, for the data blocks 210, the sum of the sync header bits 212 for each data block 210 may be equal to one. Additionally, the sync header bits 222 of the parity blocks 220 may be set in a fixed sequence, such as (0,0), (1,1), (1,1), and (0,0), and hence may have a fixed sequence of sums of bit pairs, such as zero, two, two, and zero. Alternatively, the sync header bits 222 of the parity blocks 220 may be arranged in another fixed sequence, and hence may have a different sequence of sums of bit pairs. Typically, the sum of the sync header bits 222 may be equal to zero or two. As such, the sum of the sync header bits 212 and the sync header bits 222 may be used to determine whether a corresponding block is a data block 210 or a parity block 220. Further, the sums of about four pairs of sync header bits 222 corresponding to about four consecutive blocks may be used to determine whether the four blocks are the parity blocks 220 of the FEC codeword 200.

According to the state machine model, a plurality of received blocks at about the same quantity of blocks in the FEC codeword 200, e.g., about 31 blocks, may be examined for alignment. As such, the sum of the sync header bits 212 or 222 may be obtained for each block in the sequence of received blocks. Using the sum of the sync header bits, the corresponding detected block may be compared to an expected block at the same position or sequence in the FEC codeword 200. If the sum of the sync header bits of the detected block is not equal to the sum of the sync header bits of the expected block, the detected block type may not be the expected block type. Hence, the detected block may not be aligned appropriately, and the entire sequence of blocks may be shifted or slipped by one additional block or bit. For instance, the first block in the sequence may be discarded, the position of each remaining block in the sequence may be advanced by one block or bit, and an additional received block or bit may be included at the end of the sequence. The process may then be restarted, where the shifted blocks may be detected for alignment instead of the previously examined sequence of blocks.

Alternatively, if the sum of the sync header bits of the detected block is equal to the sum of the sync header bits of the expected block in the FEC codeword 200, the detected block may be aligned appropriately, and the next block in the sequence may be detected and compared with the next expected block of the FEC codeword 200. As such, the process of detecting and comparing the remaining blocks in the sequence may continue until all the blocks are found to be aligned appropriately, e.g. with no error or mismatch in the expected sum of the sync header bits. In this case, the received blocks may represent an FEC codeword, which may then be locked. Alternatively, the process may be repeated for a second sequence of received blocks until all the blocks in the second sequence are also found to be aligned appropriately. Hence, both the first FEC codeword comprising the first sequence of detected blocks and the second FEC codeword comprising the second sequence of blocks may be locked at about the same time. Since it may be substantially less probable to falsely detect and align two consecutive sequences of blocks instead of a single sequence, detecting and comparing the second sequence in addition to the first sequence may improve the reliability of the FEC codeword locking.

The state machine model described above may require extensive searching and examining of the received blocks and considerable time delays before locking an FEC codeword. For instance, when the FEC codeword may comprise about 31 blocks, each comprising about 66 bits, a total of about 2,046 bit positions may be processed. In such a case, the average block time required for aligning one block may be equal to about six nanoseconds. When the sequence of received blocks is not block aligned, on average two complete blocks may be examined before detecting the misaligned block, and hence the state machine model may spend an average time equal to about two block times. Further, when the sequence is block aligned but not codeword aligned, the state machine model may spend an average time equal to about 13 block times. In the absence of errors in the received blocks, the state machine model may spend an average time equal to about 14 microseconds. This time may be increased when the blocks contain bit errors.

Figure 3:
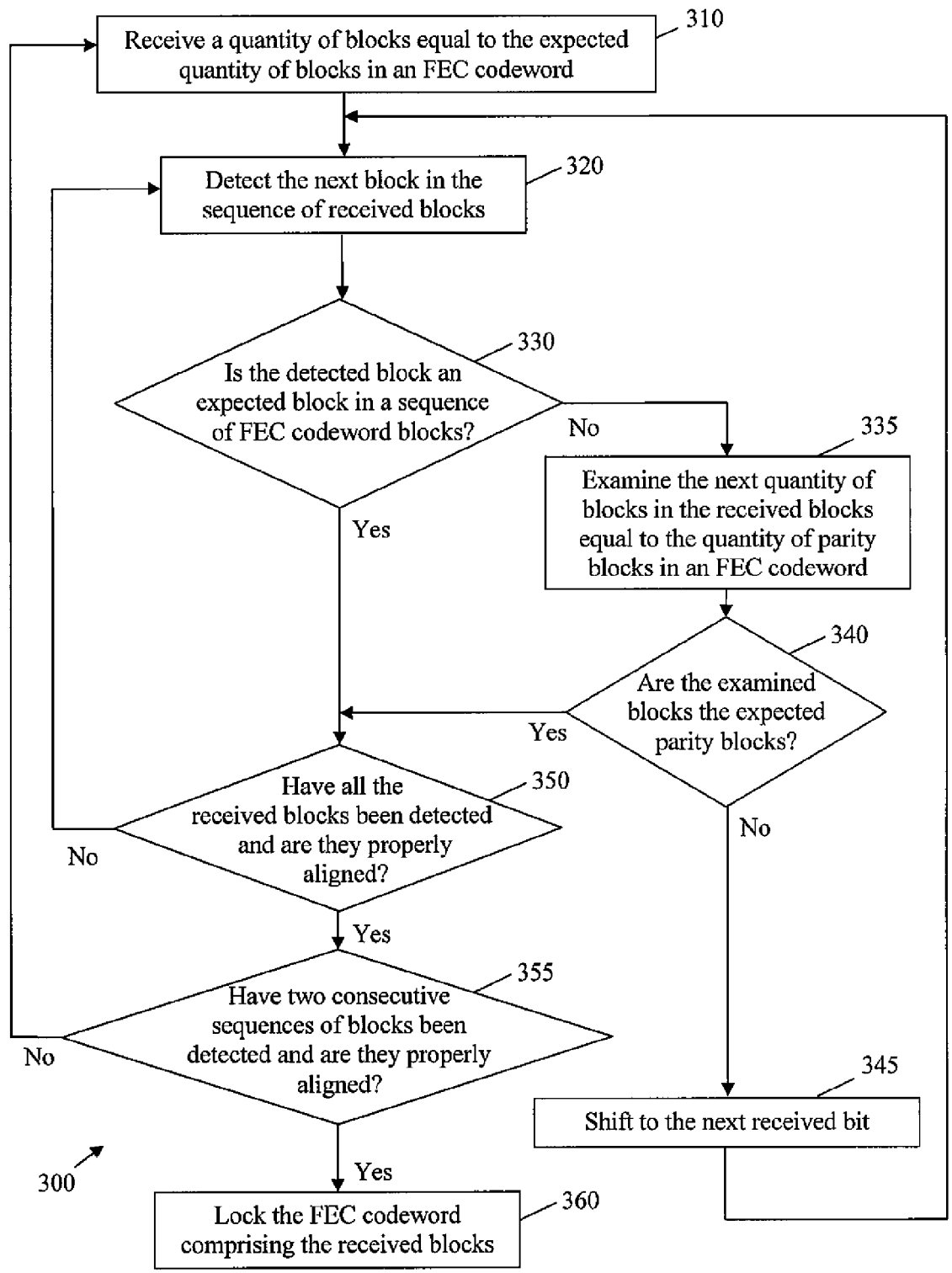
FIG. 3 is an illustration of an embodiment of an FEC codeword lock state machine method.

FIG. 3 illustrates one embodiment of an FEC codeword lock state machine method 300, which may be used for improved FEC codeword locking in terms of reducing expected locking time. The FEC codeword lock state machine method 300 may comprise some changes that may be made to the state machine described above to improve communications efficiency, which may be important for higher transmission rates, such as at about ten Gbps. Specifically, the FEC codeword lock state machine method 300 may comprise the steps of the state machine described above in addition to a step that may reduce the expected number of examined blocks and hence the expected processing time.

At block 310, the FEC codeword lock state machine method 300 may receive a quantity of blocks, for instance in a receiver buffer, which may be equal to the expected quantity of blocks in an FEC codeword. At block 320, the FEC codeword lock state machine method 300 may detect the first or next block in the sequence of received blocks. For instance, the sum of the sync header bits of the next block may be calculated to determine if the block is a data block or a parity block. For example, if the sum is equal to about one, then the block is assumed to be a data block. Alternatively, if the sum is found equal to zero or two, the block is assumed to be a parity block.

At block 330, the FEC codeword lock state machine method 300 may verify whether the detected block is an expected block in a sequence of FEC codeword blocks. For instance, the type of the block, e.g., data block or parity block, may be compared to the expected block type at the same position in the FEC codeword. Further, in the case of a detected parity block, the sum of the header bits may also be examined to verify if the detected parity block is aligned correctly within the sequence of parity blocks. For instance, the sum of the sync header bits or the pair of sync header bits of the detected parity block may be compared with the expected sum of the sync header bits or the pair of sync header bits at the same position within the parity block sequence. If the detected block is in the expected block sequence, the FEC codeword lock state machine method 300 may proceed to block 350. Otherwise, the FEC codeword lock state machine method 300 may proceed to block 335.

At block 335, the FEC codeword lock state machine method 300 may examine the next quantity of blocks in the sequence of blocks, which may be equal to the quantity of parity blocks in an FEC codeword. As such, the sum of the sync header bits of the detected blocks may be calculated. The FEC codeword lock state machine method 300 may then proceed to block 340 to verify whether the examined blocks are the expected parity blocks of the FEC codeword. For instance, the FEC codeword lock state machine method 300 may compare the sequence of the calculated sums of the sync header bits of the blocks and the expected sequence of sums corresponding to the parity blocks. If the two sequences match, the detected blocks may be the parity blocks and may be aligned appropriately and represent the end or tail of the FEC codeword. Hence, the first block in the next sequence of examined blocks may correspond to the start of a FEC codeword, which may be locked with improved probability. Further, any previously detected alignment error in the entire sequence of blocks may be assumed a bit error instead of an alignment error. The FEC codeword lock state machine method 300 may then proceed to block 350. If the two sequences do not match, the FEC codeword lock state machine method 300 may proceed to block 345, where the sequence of blocks may be shifted or slipped to the next received bit. The FEC codeword lock state machine method 300 may subsequently return to block 320, where the next block in the shifted blocks may be detected.

At block 350, the FEC codeword lock state machine method 300 may verify whether all the received blocks are detected and properly aligned. If all the received blocks are detected and properly aligned, then the blocks may correspond to an FEC codeword. Hence, the FEC codeword lock state machine method 300 may proceed to block 355. Otherwise the FEC codeword lock state machine method 300 may return to block 320 to detect the next block in the sequence.

At block 355, the FEC codeword lock state machine method 300 may verify whether two consecutive sequences of blocks are detected and properly aligned, e.g., whether two consecutive FEC codewords are received. If the condition of block 355 is met, the FEC codeword lock state machine method 300 may proceed to block 360 to lock the two consecutive FEC codewords. Otherwise, only a single sequence of blocks is detected and properly aligned, e.g., a single FEC codeword is received. Hence, the FEC codeword lock state machine method 300 may return to block 310 to determine if a second sequence of blocks may correspond to a subsequent FEC codeword.

Verifying and locking two consecutive FEC codewords instead of a single FEC codeword may reduce the probability of falsely detecting proper alignment for a plurality of received blocks. For instance, the blocks may comprise at least one bit error that may hide or mask and actual alignment error, and hence the blocks may falsely appear in proper sequence. However, it may be less likely that such bit errors hide actual alignment errors in two consecutively received block sequences. In some embodiments of the FEC codeword lock state machine method 300, the block 355 may be optional. For instance, in other embodiments, the FEC codeword lock state machine method 300 may proceed from block 350 to block 360 to lock the corresponding FEC codeword without verifying the alignment of a second sequence of blocks (at block 355).

Figure 4:
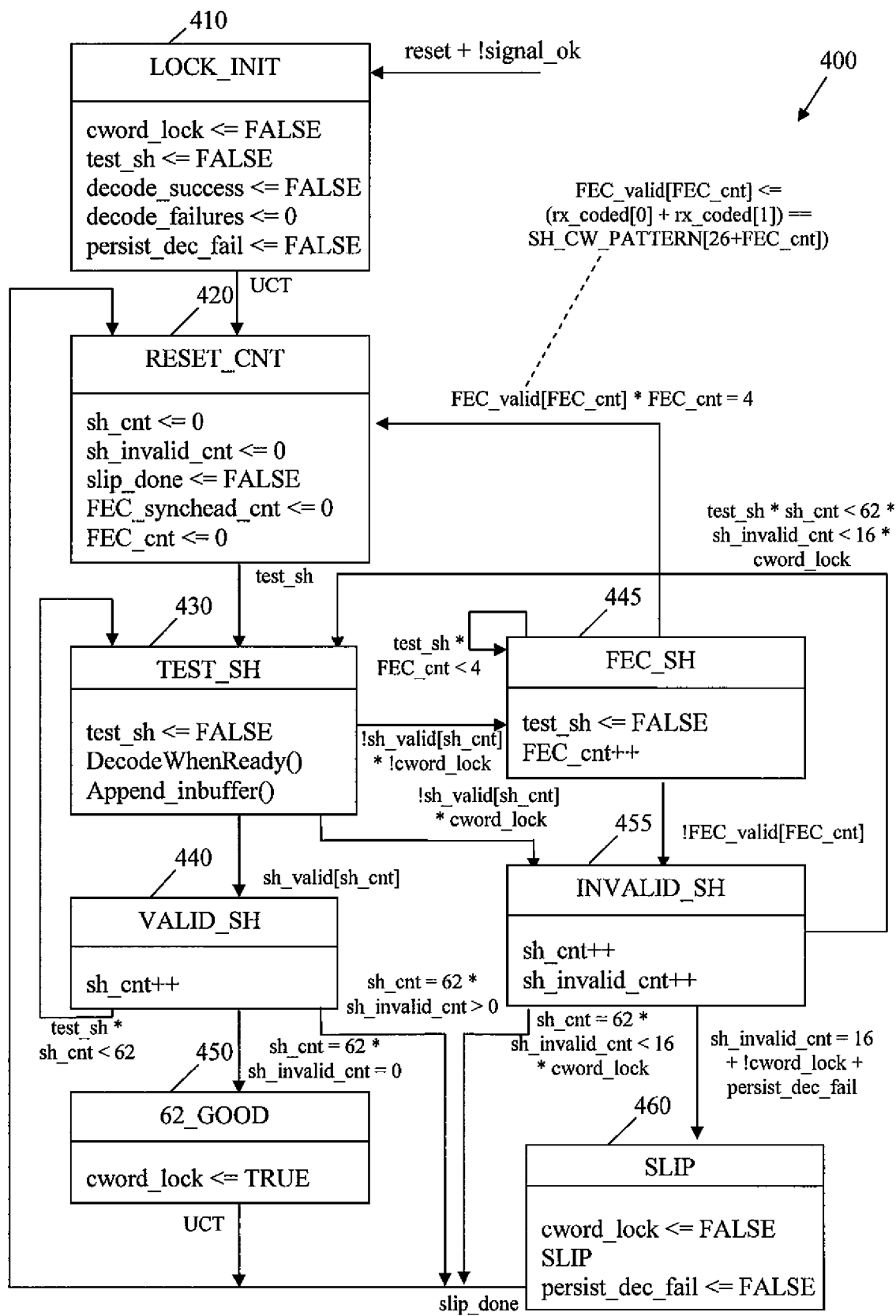
FIG. 4 is an illustration of another embodiment of an FEC codeword lock state machine method.

FIG. 4 illustrates another FEC codeword lock state machine method 400, which may comprise a plurality of states similar to the states described in the IEEE 802.3av standard, which is incorporated herein by reference as if reproduced in its entirety. However, the FEC codeword lock state machine method 400 may comprise an additional state that reduces the expected processing time and improves efficiency. Specifically, when a misaligned block is detected, the additional state may verify if the tail of the FEC codeword has been reached and then shift or slip the examined sequence of blocks and restart if the tail of the FEC has not been reached.

The FEC codeword lock state machine method 400 may be initiated at a LOCK_INIT state 410, for instance when reset parameter, a boolean variable that may indicate whether a reset signal is initiated during power on or switching to a low-power mode, may be set to true. The LOCK_INIT state 410 may also be initiated when signal_ok parameter, a boolean variable that may indicate whether the received blocks reached the expected quantity of blocks in a codeword, may be set to false. In some embodiments, the LOCK_INIT state 410 may be initiated when the state machine is reset or an initiation signal is not detected.

During the LOCK-INIT state 410, a plurality of parameters may be initialized. For instance, cword_lock parameter, which may be a boolean variable that indicates whether a receiver has acquired a codeword delineation, may be set to fault. A test_sh parameter, which may be a boolean variable that indicates whether a new sync header is available for testing, may be set to false. A decode_success parameter, which may be a boolean variable that indicates whether a codeword has been locked, may be set to false. A decode_failures parameter, which may be a counter that indicates the quantity of consecutive locking failures, may be set to about zero. A persist_dec_fail parameter, which may be a boolean variable that indicates whether the quantity of consecutive locking failures exceed a limit, such as about two, may be set to false. The FEC codeword lock state machine method 400 may then proceed to a RESET_CNT state 420, for instance using an unconditional transfer (UCT) procedure.

During the RESET_CNT state 420, a plurality of parameters may also be initialized. For instance, sh_cnt parameter, which may be a counter that indicates the quantity of sync headers checked within the received blocks, may be set to about zero. In some embodiments, an alternative parameter may be used to indicate the quantity of sync headers, such as sh_wndw_cnt in the IEEE 802.3av standard. A sh_invalid_cnt parameter, which may be a counter that indicates the quantity of invalid sync headers within the received blocks, may be set to about zero. A slip_done parameter, which may be a boolean variable that indicates whether a SLIP procedure has been completed and the next block sync position can be tested, may be set to false. A FEC_cnt parameter, which may be a counter that indicates the quantity of detected parity sync headers, may be set to about zero. Additionally, in some embodiments, a FEC_synchead_cnt parameter, which may be a counter that indicates the quantity of detected FEC codeword sync headers, may be set to about zero. The FEC codeword lock state machine method 400 may then proceed to a TEST_SH state 430 state.

During the TEST_SH state 430, the test_sh may be set to false. Next, a DecodeWhenReady( ) procedure may be implemented, which may determine if a buffer contains the expected quantity of blocks in an FEC codeword block. Additionally, during the DecodeWhenReady( ) procedure, a sub-procedure may be implemented to detect if the blocks are properly aligned, such as a Decode( ) procedure in the IEEE 802.3av standard. If the blocks are aligned, the received blocks may correspond to a FEC codeword and the buffer may then be cleared. An Append_inbuffer( ) procedure may then be implemented, which may detect a next received block of appropriate bit size, e.g., at about 66 bits. The FEC codeword lock state machine method 400 may proceed to a VALID_SH state 440 state, for instance when a sh_valid [sh_ent] parameter is set to true, which may indicate that the received block's sync header is valid. In making such a determination, the sh_valid[sh_cnt] parameter may correspond to a position in a sh_valid array that matches the sh_cnt parameter. Alternatively, the FEC codeword lock state machine method 400 may proceed to an FEC_SH state 445 when the sh_valid[sh_cnt] parameter is set to false and the cword_lock parameter is set to false, or to an INVALID_SH state 455 when the sh_valid[sh_cnt] parameter is set to false and the cword_lock parameter is set to true.

During the VALID_SH state 440, the sh_cnt parameter may be incremented by one. The FEC codeword lock state machine method 400 may then proceed to a 62_GOOD state 450, for instance when the sh_cnt parameter is equal to about 62 and the sh_invalid_cnt parameter is equal to about zero. Alternatively, the FEC codeword lock state machine method 400 may return to the TEST_SH state 430 when the test_sh parameter is set to true and the sh_cnt parameter is less than about 62, or instead to the RESET_CNT state 420 when the sh_cnt parameter is equal to about 62 and the sh_invalid_cnt is greater than about zero. During the 62_GOOD state 450, the cword_lock parameter may be set to true. The FEC codeword lock state machine method 400 may then return to the RESET_CNT state 420, for instance using the UCT procedure.

The FEC_SH state 445 may verify if the last sequence of blocks in the received blocks match the parity blocks of an FEC codeword. During the FEC_SH state 445, the test_sh parameter may be reset to false and the FEC_cnt parameter may be incremented by one. The FEC codeword lock state machine method 400 may return to the RESET_CNT state 420 when a FEC_valid[FEC_cnt] parameter is set to true and the FEC_cnt parameter is equal to about four, which may indicate that the last blocks in the sequence of blocks match the parity blocks. Specifically, the FEC_valid[FEC_cnt] parameter may correspond to a position in an FEC_valid array that matches the FEC_cnt parameter. The FEC_valid [FEC_cnt] parameter may be set to true if the sum of the sync headers matches the expected sum of an FEC codeword. Alternatively, the FEC codeword lock state machine method 400 may restart the FEC_SH state 445 when the test_sh parameter is set to true and the FEC_cnt parameter is less that about four, or instead proceed to an INVALID_SH state 455 when the FEC_valid[FEC_cnt] parameter is set to false, which may indicate that the last blocks in the sequence of blocks may not be the parity blocks.

In an embodiment, the FEC_valid[REC_cnt] parameter may be set to true if the sum of an rx_coded[0] parameter and an rx_coded[1] parameter is equal to a sh_CW_PATTERN [26+FEC_cnt] parameter. The rx_coded[0] parameter and rx_coded[1] parameter may correspond to a first and second position in an rx_coded array. The rx_coded array or vector may comprise the bits of the next detected block, which may be about 66 bits. Hence, the rx_coded[0] parameter and rx_coded[1] parameter may comprise the sync header bits of the block. The SH_CW_PATTERN[26+FEC_cnt] parameter may correspond to a position beyond the 26$^{th}$ position in a sh_CW_PATTERN array that matches the FEC_cnt. The SH_CW_PATTER array may be a constant and may comprise the sequence of sums of sync header bits in an FEC codeword. For instance, the SH_CW_PATTER array may comprise about 31 sums of sync headers corresponding to about 31 blocks in an FEC codeword. The last four sum values may be equal to about zero, about two, about two, and about zero, which may correspond to the parity blocks. Hence, the SH_CW_PATTERN[26+FEC_cnt] parameter may correspond to one of the parity blocks.

During the INVALID_SH state 455, the sh-cnt parameter and the sh_invalid_cnt parameter may each be incremented by one. The FEC codeword lock state machine method 400 may then proceed to a SLIP state 460 when the sh_invalid_cnt parameter is equal to about 16 for example, the cword_lock parameter is set to false, the persist_dec_fail parameter is set to false, or combinations thereof. Alternatively, the FEC codeword lock state machine method 400 may return to the RESET_CNT state 420 when the sh_cnt parameter is equal to about 62, the sh_invalid_Cnt parameter is less than about 16, and the cword_lock parameter is set to true. During the SLIP state 460, the cword_lock parameter may be set to false, the SLIP procedure may be implemented, and the persist_dec_fail parameter may be incremented by one. The FEC codeword lock state machine method 400 may then return to the RESET_CNT state 420 when the slip_done parameter is set to true, for instance in the SLIP procedure steps.

Figure 5:
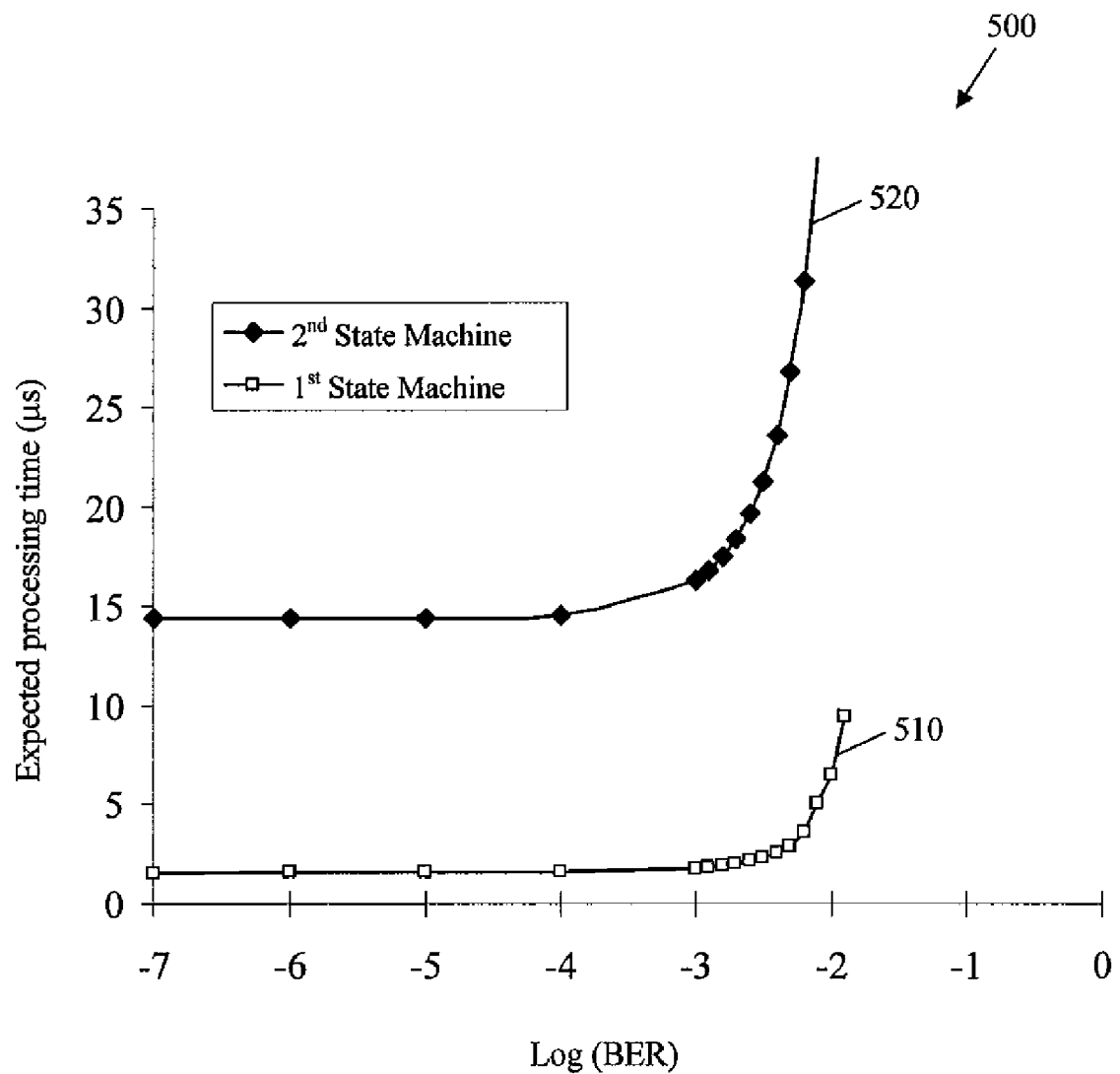
FIG. 5 is a chart illustrating an FEC codeword lock state machine processing time at various bit error rates (BERs).

FIG. 5 is an illustration of an embodiment of an FEC codeword lock state machine processing time 500. Specifically, a first curve 510 comprising a plurality of expected processing time values vs. a plurality of BER values is shown. The expected processing time values may represent the average codeword lock time using a first FEC codeword locking state machine method, such as the FEC codeword lock state machine method 400. The expected processing time may range from about two microseconds (μs) to about ten μs, and the BER values may range from about $10^{-7}$ to about $10^{-2}$. Notably, the expected processing time is about 1.5 μs at BER values from about $10^{-7}$ db to about $10^{-3}$ db. Also shown, is a second curve 520 comprising a plurality of expected time values, which may represent the average codeword lock time using a second FEC codeword locking state machine method, for example a codeword lock state machine similar to that described in FIG. 4 but without block 445. The expected processing time values of the second curve 520 may be substantially greater than the expected processing time values of the first curve 510. For example, the expected processing time values of the second curve 520 may range from about 15 μs to at least about 35 μs for the same BER values of the first curve 510.

Unlike the first FEC codeword locking state machine method (of the first curve 510), when a misaligned block is detected, the second FEC codeword locking state machine method (of to the second curve 520) may proceed to slip the received sequence of blocks by one block or bit without first verifying if the last blocks match the tail of the FEC codeword, e.g., the parity blocks. Verifying if the next blocks represent the parity blocks of the FEC codeword may avoid unnecessary shifting and detection of the blocks and achieve faster locking time. Further, the improvement in locking time may improve as the BER values increase.

Figure 6:
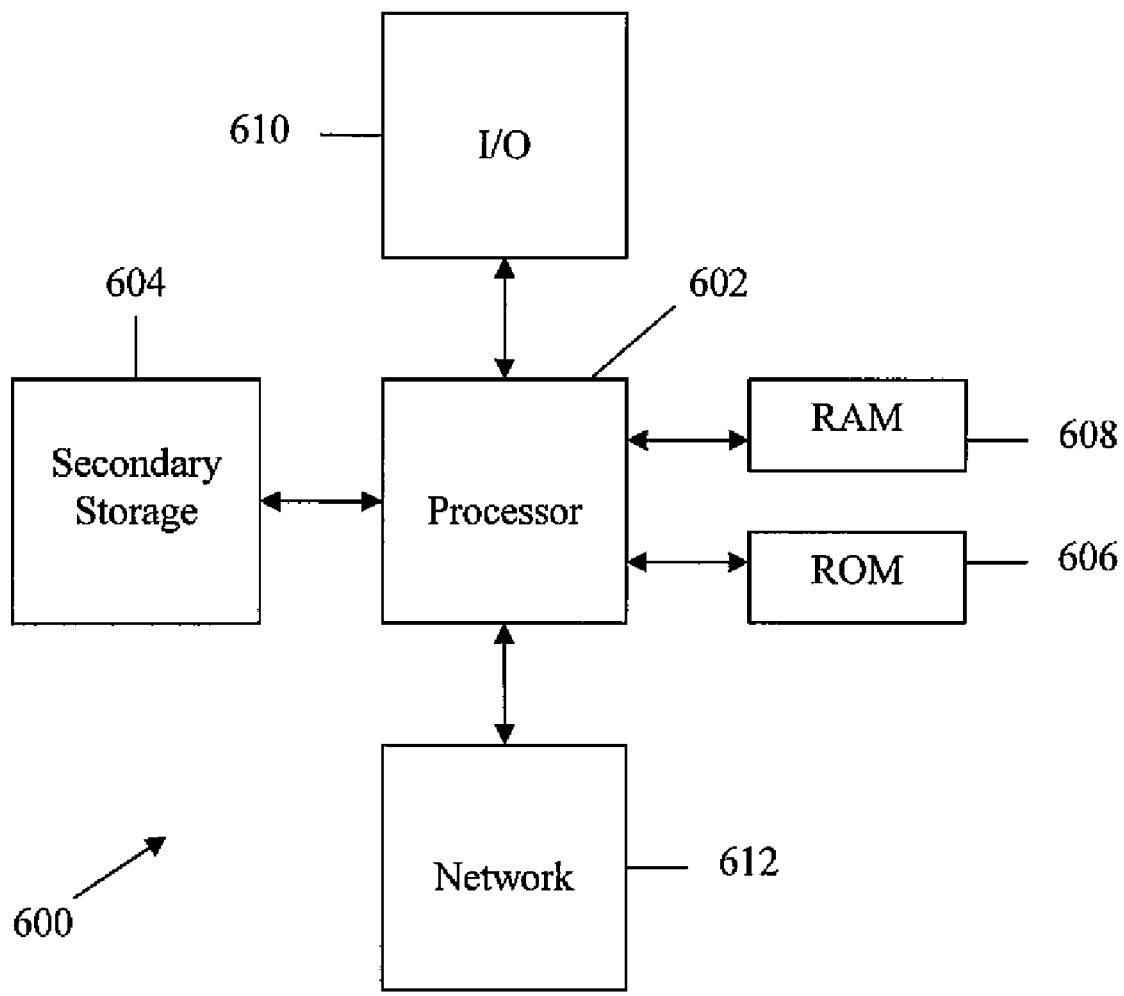
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a Forward Error Correction (FEC) processor coupled to an optical receiver,
   wherein the FEC processor is configured to compare a plurality of received blocks to a plurality of FEC codeword blocks comprising a plurality of parity blocks, and upon detecting a misaligned block in the received blocks, compare at least some of the remaining received blocks to the parity blocks.

2. The apparatus of claim 1, wherein each of the received blocks and the FEC codeword blocks is one of the parity blocks or a data block.

3. The apparatus of claim 2, wherein each of the parity blocks and data blocks comprises a plurality of sync header bits and a plurality of payload bits.

4. The apparatus of claim 3, wherein the FEC codeword blocks comprise about 27 data blocks and about four parity blocks, wherein each of the data blocks comprises about two sync header bits and about 64 payload bits, and wherein each of the parity blocks comprises about two sync header bits and about 64 payload bits.

5. The apparatus of claim 4, wherein the sum of the sync header bits of the data blocks is equal to one, and wherein the sum of the sync header bits of the parity blocks is equal to zero or two.

6. The apparatus of claim 5, wherein the sum of the sync header bits of the parity blocks of the FEC codeword is fixed.

7. The apparatus of claim 6, wherein the last four sums of the sync header bits of the parity blocks of the FEC codeword are equal to zero, two, two, and zero.

8. The apparatus of claim 3, wherein the misaligned block is detected when the sum of the sync header bits of the misaligned block is not equal to the sum of the sync header bits of a corresponding block at the same position in the FEC codeword.

9. An apparatus comprising:
   at least one component configured to implement a method comprising:
   receiving a plurality of blocks, wherein the quantity of received blocks is equal to a quantity of blocks in a Forward Error Correction (FEC) codeword;
   selecting one of the received blocks;
   determining whether the selected block is aligned with the FEC codeword; and
   determining whether the remaining blocks correspond to the FEC codeword when the selected block is not aligned with the FEC codeword.

10. The apparatus of claim 9, wherein the method further comprises slipping the blocks by one block or bit when the remaining blocks do not correspond to the FEC codeword.

11. The apparatus of claim 10, wherein the method further comprises:
    when the selected block is aligned with the FEC codeword or the remaining blocks correspond to the FEC codeword, receiving a plurality of second blocks and determining whether the second blocks are aligned with the FEC codeword, and
    wherein the quantity of second blocks is equal to the quantity of blocks in the FEC codeword.

12. The apparatus of claim 9, wherein the last four blocks of the FEC codeword have a fixed sequence of sums of a plurality of sync header bits.

13. The apparatus of claim 9, wherein the remaining blocks correspond to the FEC codeword when the sums of a plurality of sync header bits in the remaining blocks are equal to the sums of the sync header bits of the FEC codeword.

14. The apparatus of claim 9, wherein the selected block is not aligned when the selected block comprises a bit error or when a sum of a plurality of sync header bits of the selected block is not equal to a sum of a plurality of sync header bits in a corresponding block at the same position in the FEC codeword.

15. A method comprising:
    obtaining a codeword lock in a Forward Error Correction (FEC) codeword lock state machine using a state that verifies whether a plurality of blocks represents the end of a FEC codeword, wherein an additional state is implemented when one of the blocks is not aligned with the FEC codeword.

16. The method of claim 15, wherein the misaligned block is a first block in the blocks.

17. A method comprising:
    obtaining a codeword lock in a Forward Error Correction (FEC) codeword lock state machine using a state that verifies whether a plurality of blocks represents the end of a FEC codeword,
    wherein a time to obtain codeword lock is less than about 10 microseconds ($\mu s$).

18. The method of claim 17, wherein the time to obtain codeword lock is less than about 10 $\mu s$ at about $10^{-2}$ bit error rate (BER).

19. A method comprising:
    obtaining a codeword lock in a Forward Error Correction (FEC) codeword lock state machine using a state that verifies whether a plurality of blocks represents the end of a FEC codeword,
    wherein a time to obtain codeword lock is no more than about 2 microseconds ($\mu s$) from about $10^{-7}$ bit error rates (BERs) to about $10^{-3}$ BERs.

20. A method comprising:
    receiving a bit stream comprising a sync header pattern; and
    when finding a match of two full codewords consisting of 62 blocks in the bit stream, asserting a codeword lock for the bit stream.

21. The method of claim 20, further comprising:
    when in codeword lock, checking for sync header validity and if 16 or more sync headers in a codeword pair consisting of 62 blocks are invalid, deasserting the codeword lock.

* * * * *